No. 724,378. PATENTED MAR. 31, 1903.
J. P. CLEAL.
CASH REGISTER.
APPLICATION FILED DEC. 8, 1897.
NO MODEL. 5 SHEETS—SHEET 1.

WITNESSES: Wm. McCarthy
Wm. H. Murry

INVENTOR.
Joseph P. Cleal
BY Alvan Macauley,
his ATTORNEY.

No. 724,378. PATENTED MAR. 31, 1903.
J. P. CLEAL.
CASH REGISTER.
APPLICATION FILED DEC. 8, 1897.
NO MODEL. 5 SHEETS—SHEET 2.

WITNESSES.
Wm. McCarthy
Wm. H. Muzzy

INVENTOR.
Joseph P. Cleal
BY Alvan Macauley
ATTORNEY.

No. 724,378. PATENTED MAR. 31, 1903.
J. P. CLEAL.
CASH REGISTER.
APPLICATION FILED DEC. 8, 1897.
NO MODEL. 5 SHEETS—SHEET 3.

WITNESSES:
Wm. M. McCarthy
Wm. H. Muzzy

INVENTOR.
Joseph P. Cleal,
BY Alvan Macauley
his ATTORNEY.

No. 724,378. PATENTED MAR. 31, 1903.
J. P. CLEAL.
CASH REGISTER.
APPLICATION FILED DEC. 8, 1897.
NO MODEL. 5 SHEETS—SHEET 4.

WITNESSES: INVENTOR.
Wm. McCarthy Joseph P. Cleal.
BY Alvan Macauley
ATTORNEY.

No. 724,378. PATENTED MAR. 31, 1903.
J. P. CLEAL.
CASH REGISTER.
APPLICATION FILED DEC. 8, 1897.
NO MODEL. 5 SHEETS—SHEET 5.

UNITED STATES PATENT OFFICE.

JOSEPH P. CLEAL, OF DAYTON, OHIO, ASSIGNOR, BY MESNE ASSIGNMENTS, TO NATIONAL CASH REGISTER COMPANY, OF JERSEY CITY, NEW JERSEY, A CORPORATION OF NEW JERSEY.

CASH-REGISTER.

SPECIFICATION forming part of Letters Patent No. 724,378, dated March 31, 1903.

Application filed December 8, 1897. Serial No. 661,170. (No model.)

*To all whom it may concern:*

Be it known that I, JOSEPH P. CLEAL, a citizen of the United States, residing at Dayton, in the county of Montgomery and State of Ohio, have invented certain new and useful Improvements in Cash-Registers; and I do hereby declare the following to be a full, clear, and exact description of the invention.

This invention relates to improvements in cash registers and indicators, particularly of the class shown in my prior patent, No. 583,889, dated June 8, 1897, and in the patent to Cleal and Reinhardt, No. 580,378, granted April 13, 1897.

One of the several objects of my invention is to provide means for increasing the registering capacity of a cash-register without extending the number of banks of keys.

My invention makes it possible to double the registering capacity by the addition of a single key.

The invention consists of certain novel constructions, combinations, and arrangements of parts, all of which will be hereinafter more particularly set forth and claimed.

Figure 1:
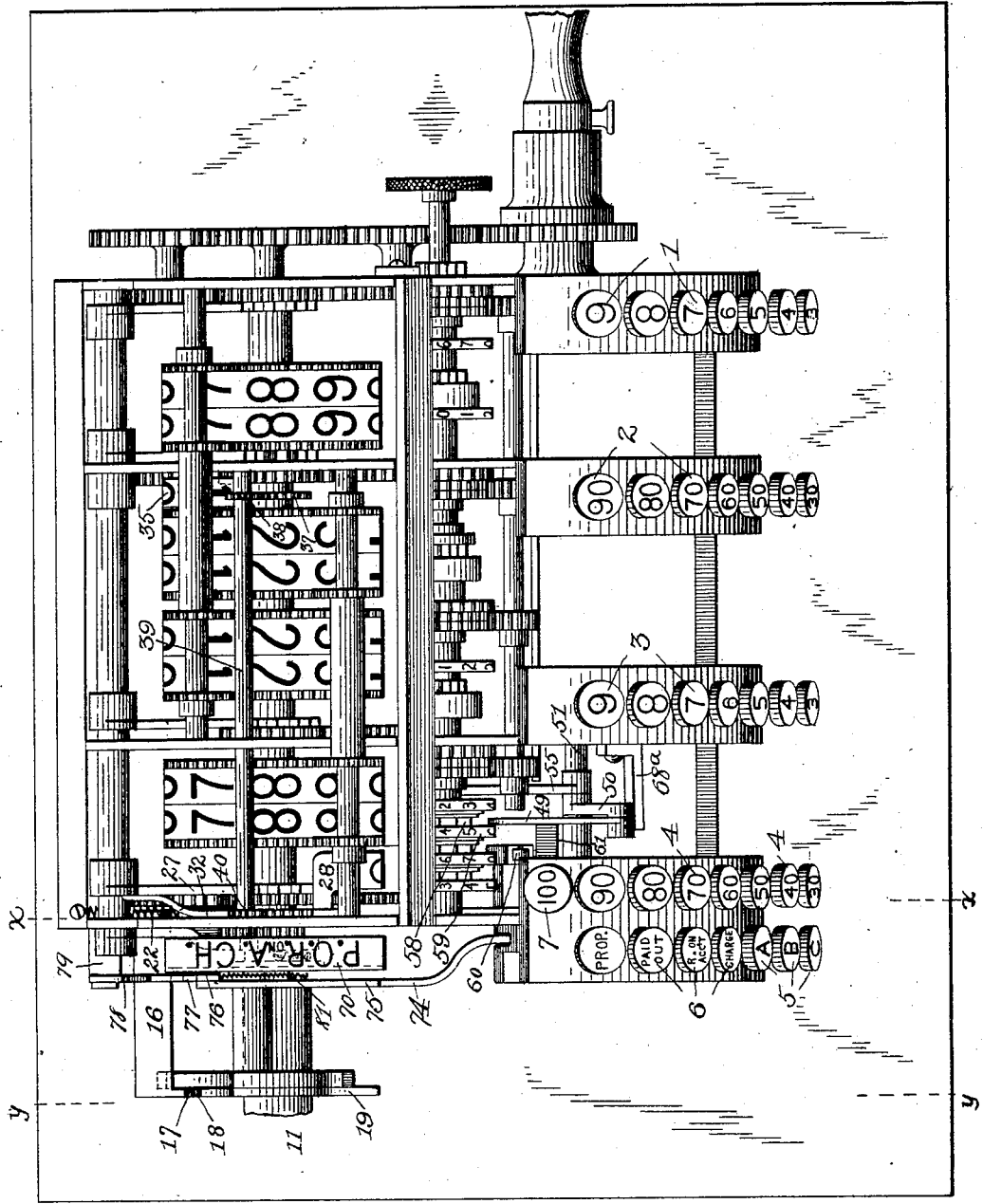
Figure 2:
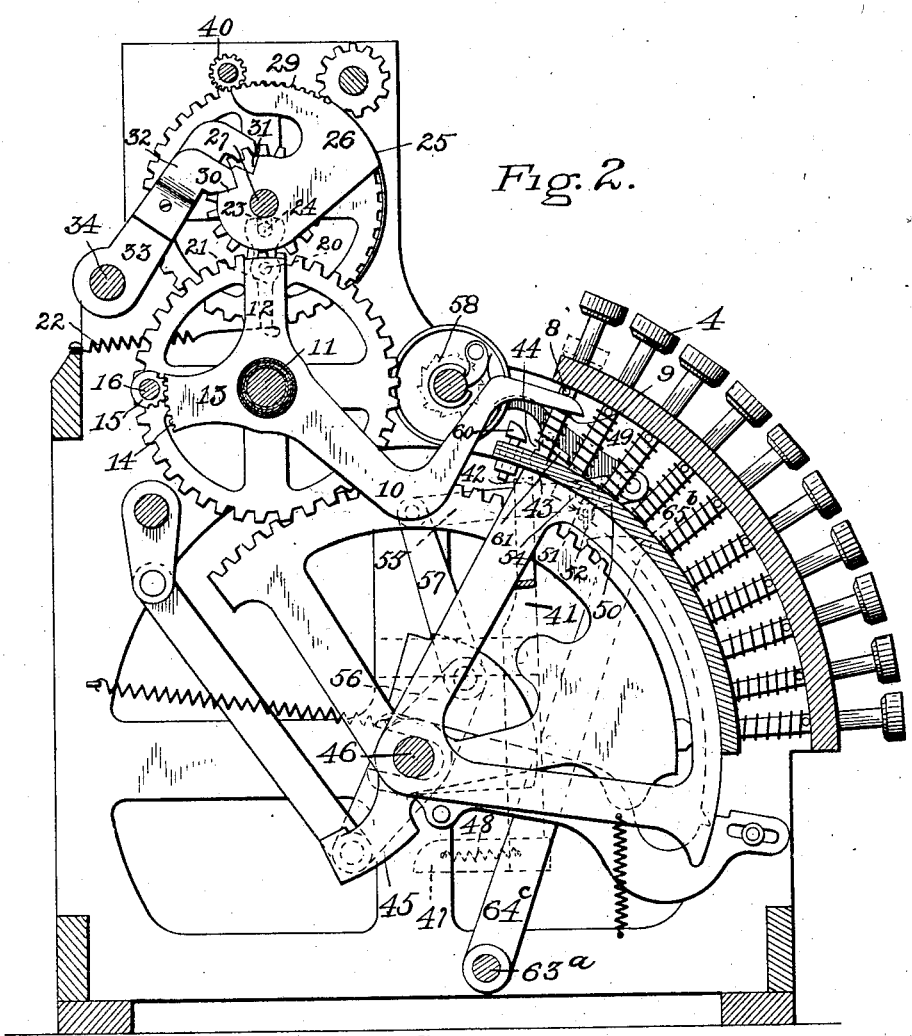
Figure 4:
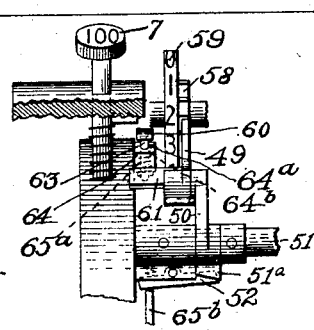
Figure 3:
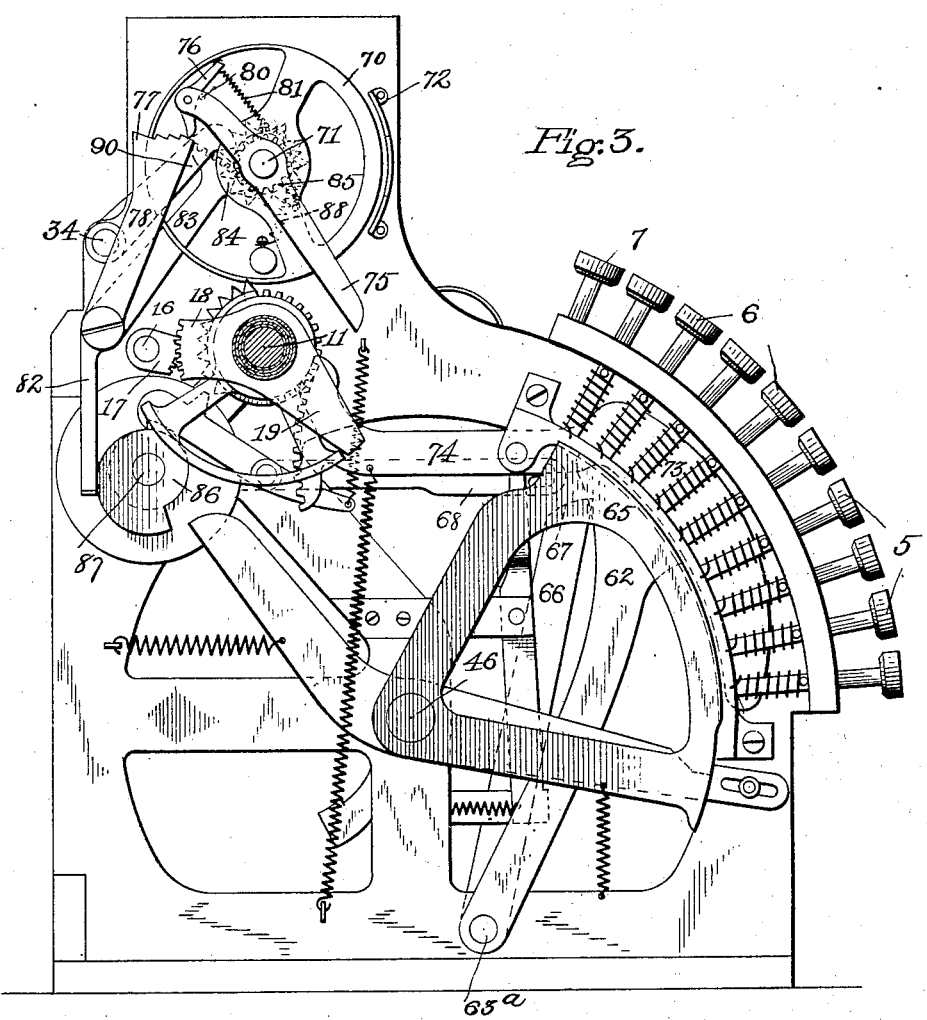
Figure 5:
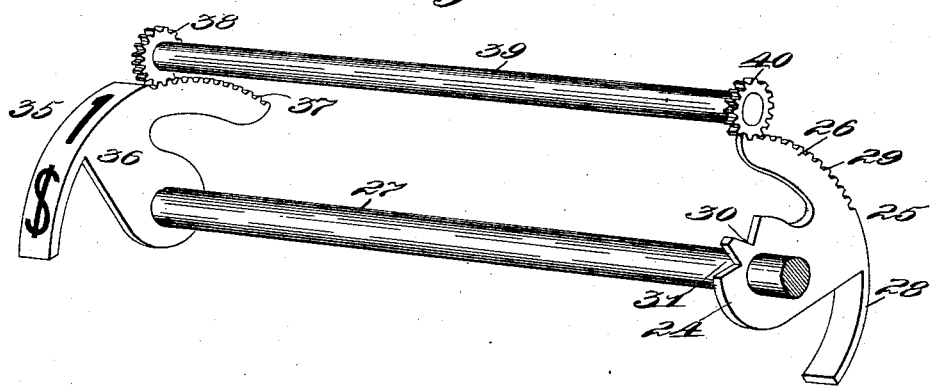
Figure 6:
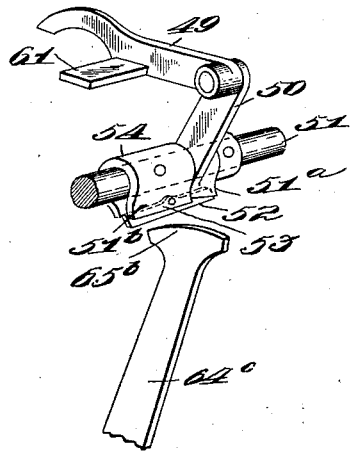
Figure 7:
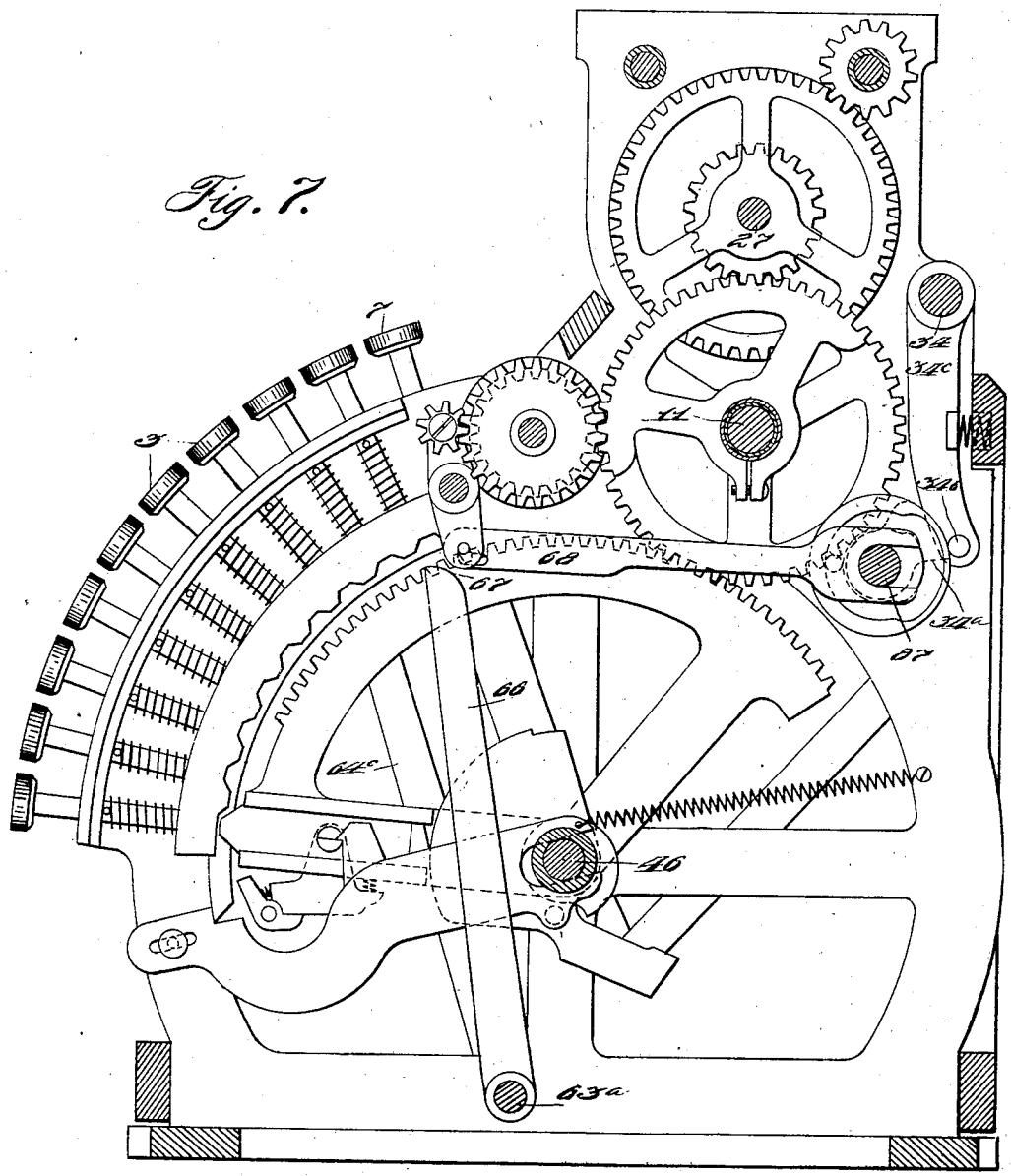

In the accompanying drawings, forming part of this specification, Figure 1 represents a top plan view of the improvements embodying my invention applied to a machine of the ⟨class⟩ above mentioned. Fig. 2 represents a ⟨late⟩ral vertical section through the same on line *x x* of Fig. 1. Fig. 3 represents a ⟨sim⟩ilar view on the line *y y* of Fig. 1. Fig. 4 represents an enlarged detail elevation view, partly in section, of the register-operating pawl and surrounding mechanism. Fig. 5 represents an enlarged detail perspective view of the independent indicators and their connections. Fig. 6 represents an enlarged detail perspective view of the independent operating-pawl and its surrounding mechanism, and Fig. 7 represents a vertical section through a machine of the class to which I have applied my invention.

As the present invention does not include the construction of any of the banks of keys except the one-hundred-dollar key hereinafter described, detail description of the same is omitted and attention called to the above-mentioned patents for the same.

1 1 in the drawings indicate the keys representing units of cents; 2 2, the keys representing tens of cents; 3 3, the keys representing units of dollars; 4 4, the keys representing tens of dollars; 5 5, the special keys for governing the printing of the separate clerk's letters upon the checks; 6 6, the special keys for throwing the registering mechanisms out of gear, and 7 my improved one-hundred-dollar key. This latter key is mounted in the same manner as the remaining keys, a description of which will be found in the above-mentioned patent, so that its stop-pin 8, against which its returning-spring 9 rests, will contact with a bell-crank lever 10 to operate the same when the key is depressed. This lever 10 is loosely mounted upon the shaft 11 and is provided with two operating-arms 12 and 13, which extend at right angles to each other. The arm 13 is formed at its end into a segmental rack 14, which meshes with a pinion 15, said pinion being fast upon a short shaft 16, suitably journaled in the frame of the machine. The said shaft is further provided with a segmental rack 17, fast thereon and meshing with a segmental rack 18, loose upon the said shaft 11. A one-hundred-dollar printing-arm 19 is formed integral with said rack 18, so as to turn therewith and bring the type mounted on the end of said arm into the correct printing position. It will be observed by reference to the drawings that the location of the printing-arm 19 in relation to the printing-segments is such that the one-hundred-dollar type will print to the left of all the remaining type which indicate the amount of the purchase.

The above-described devices, which are governed by the movements of the arm 13, only affect the check-printing mechanism, the indicator mechanism being operated by the companion arm 12. This arm is provided near its end with a laterally-projecting stud 20, upon which is journaled a short operating-lever 21. A coil-spring 22, having one end connected to the main frame, is attached to the lower end of said lever, while the upper end of the latter is bifurcated, as at 23, to receive a stud 24, mounted upon the one-hundred-dollar indicator 25. This indicator 25 comprises a segmental plate 26, loosely mounted upon the indicator-shaft 27, and a curved numeral-plate 28, extending at right angles to said plate 26 and of sufficient length to contain the numeral "1" and the dollar-mark. The said plate 26 is further formed with a segmental rack edge 29 and notches 30 31, the latter being located in its hub portion, so as to be entered by an auxiliary locking-pawl 32, secured to one of the main locking-pawls 33, which is in turn secured rigidly upon the pawl rock-shaft 34.

By means of the above-described devices the depression of the key 7 will cause the bell-crank lever 10 to be operated, and thus throw the arm 12 forward. This movement of said arm will of course also carry the lever 21 forward and put the spring 22 under tension, said spring being in its normal condition before such movement. It will be observed that the tension of the spring 22 is now thrown on the indicator 25 through the medium of the slot 23 and pin 24 and that the said indicator is held from movement only by the pawl 32. Should the machine now be operated, the cam 34$^a$, mounted upon the rotary shaft 87, will pass out of the path of the pin 34$^b$, mounted on arm 34$^c$, allowing the latter to spring forward, and thereby rocking shaft 34 to disengage the pawl 32 from the notch 30, and thus permit the indicator to be operated to bring the one-hundred-dollar numeral into view in the extreme left-hand indicator-opening facing the operator. The movement of the indicator 25 is accompanied by a simultaneous movement of a duplicate indicator 35, adapted to be read by the customer from the front of the machine and comprising a segmental plate 36, loose upon the shaft 27, and a curved indicating-numeral plate extending at right angles to said plate. This plate 36 is formed with a segmental rack 37, which meshes with a pinion 38, fast upon an auxiliary shaft 39, which latter is suitably journaled in the frame of the machine. The shaft 39 is further provided with a pinion 40, which meshes with the rack 29, so that the indicators 25 and 35 move simultaneously. After the indicators have been set the pawl 32 enters the notch 31, and thus holds the indicators in this position even after the key 7 has again assumed its normal position, and thus released the end of the lever 10 from all restraint. The indicators and operating devices for the same are all returned to their normal positions upon a subsequent operation of the machine at such time as the pawl is disengaged from the notch 31, the tension of the spring 22 causing such movements. The said one-hundred-dollar key 7 is held down after being depressed to operate the lever 10 by a pivoted latching-lever 41, mounted upon the frame and having an arm or offset 42, against which the lower beveled end 43 of said key normally rests. Upon the key being depressed this beveled portion 43 forces the arm 42 outward and causes it to enter a notch 44, formed in said key, thus holding the latter down until the lever 41 is tripped. This action of the lever is accomplished by a trip 45, fast upon an auxiliary power-shaft 46 and adapted to contact with an arm 47, formed on the lower end of the lever, the latter being held in its normal position by a coil-spring 48, secured to said lever and a portion of the frame of the machine. By this means the key 7 is held down until after the indicators have been operated and locked in position by the pawl 32 and then tripped or released, so that the lever 10 is free to rise upon the pawl being again actuated by the operation of the machine.

The above-described mechanisms cover the one-hundred-dollar key and the printing and indicating devices actuated by the same, and I will therefore now pass on to the register-operating mechanism for the same. This consists, primarily, of a pawl 49, pivotally mounted upon an arm 50, which in turn is loosely mounted upon a short rock-shaft 51, the opposite ends of which are journaled in the frames of two of the key-banks. The hub of the said arm 50 is formed with two spaced lugs 51$^a$ 51$^a$, having incline edges for the more ready passage of the end of the pivoted latch 52 over the same and into the space between said lugs. This latch 52 is pivotally mounted between two parallel flanges 53, formed on a sleeve 54, which is fast to the shaft 51, so as to turn therewith. A coil-spring 51$^b$ is mounted between the flanges 54 and under the latch 52, so as to normally force the rear of said latch outward. This shaft 51 is actuated by an arm 55, fast thereon and pivotally connected to an operating-arm 56 on the shaft 46 by a link-bar 57. By this means the shaft 51 is oscillated upon each oscillation of the shaft 46. The forward or operating end of the pawl 49 operates in proximity to the ratchet-pawl 49 of the one-hundred-dollar register-wheel 58 of the one-hundred-dollar registering-wheel 59, but is normally held out of any contact with said ratchet-wheel by a spring-pressed plunger or support 60, over which a laterally-projecting arm 61 of the pawl rides when the pawl is forced forward, as before described. The said support 60 comprises a head having an upper incline surface and a shank 63, which latter operates in a socketed block 64, secured to the frame. This block is formed with a vertical groove 64$^a$, into which extends a guiding-stud 64$^b$, mounted on the stem 63. A coil-spring 65$^a$ is mounted in said block about said shank so that its upper end engages the stud 64$^b$ to normally force the support upward to such an extent that the pawl will be prevented from engaging the ratchet-wheel 58 upon passing forward. When the key 7 is depressed, the laterally-projecting pin 8 occupies such a position that the arm 61 must pass under the same upon the pawl 49 being operated, and thus depress the support 60 to such an extent that the end of said pawl engages the ratchet-wheel 58 and turns the same forward one numeral. This movement of the ratchet-wheel and registering-wheel carried thereby occurs before the time of the regular movement of said wheel, so as not to interfere with said regular movement should it happen to take place during the same movement of the machine. It will be observed from the foregoing that the latch 52 normally locks with the arm 50 by resting between the lugs 51ᵃ. When either of the special keys 6 is depressed, the latch 52 is thrown out of engagement with said lugs 51ᵃ, which permits of the shaft 51 operating without throwing the pawl 49. This result is accomplished by means of a trip-lever 62, rigidly mounted upon a rock-shaft 63ᵃ and formed at its upper end into a segmental trip-plate 65, which normally occupies a position under the lower ends of the stems of said keys 6, whereby the depression of the latter will cause said stems to engage the edge of said segment and force said lever 62 forward. The construction and mounting of the said lever are such that it returns to its normal position when relieved of all restraint by its own specific gravity. This action is further accelerated by the motion given to the rock-shaft by other devices connected thereto and hereinafter described. The said rock-shaft is journaled in the lower portion of the frame of the machine and is provided with an upwardly-extending tripping-arm 64ᶜ, having an enlarged segmental upper end 65ᵇ, which is adapted to contact with the protruding end of the latch 52 when the tripping-arm is operated, and thus disengage the forward end of said latch from the lugs 51ᵃ. Said rock-shaft 63ᵃ is further provided with another tripping-arm 66, having an incline upper edge 67, which is adapted to engage and lift the reciprocating bar 68 into inoperative position to render the register-operating gears inoperative, as fully described in my said patent. The weight of the said bar 68 resting upon the incline edge 67 also assists in returning the lever 62 to its normal position, as before mentioned.

Should any one of the special keys 6 be depressed together with the one-hundred-dollar key, it will be observed that the latch 52 will thereby be withdrawn from between the lugs 51ᵃ, and thus render the pawl inoperative. This construction prevents all registration when either of the keys 6, which represent, respectively, "Paid out," "Received on account," and "Charge," are operated. The depression of any one of the keys 6, and consequential operation of the latch 52, leaves the arm 50 loose upon the shaft 51. In order to prevent this arm dropping out of its proper position for reëngagement with the latch, a rigid arm 68ᵃ is mounted upon the frame of one of the key-banks, so as to form a support against which said arm may rest.

By means of the above-described mechanisms I am enabled to increase the capacity of the present machine just twofold. In other words, while the present machine will record, print, and indicate at one operation amounts aggregating ninety-nine dollars and ninety-nine cents my improved construction, including the one-hundred-dollar key, will record, print, and indicate amounts aggregating one hundred and ninety-nine dollars and ninety-nine cents. The advantages of this additional key in a machine of this class are so obvious to one skilled in the art that any further statements in regard to the same would be superfluous.

I claim—

1. In a cash-register, the combination with a counter, of a series of keys coöperating with the same, an independent counter-operating mechanism adapted to actuate the counter independently of its operation in connection with said keys, a special key for said independent mechanism and means for adjusting said independent mechanism to render the same inoperative irrespective of the action of its special key.

2. In a cash-register of the class described, the combination with a printing device, of an indicator, a spring-actuated lever for setting said indicator, a special key and means connecting the special key to the indicator-actuating lever and the printing device so as to move the same together.

3. In a cash-register, the combination with a special indicator, of a spring setting device for said indicator, a latch for the indicator and a special key for putting the spring device under tension so that the indicator will be set thereby when released.

4. In a cash-register, the combination with a special indicator, of a printing device, a special key, means for positively setting the printing device upon the operation of the key, spring setting devices for the indicator arranged to be put under tension by the operation of the key, and latching means for the indicator arranged to release it after the spring device is put under tension.

5. In a cash-register of the class described, the combination with a plurality of keys, of main operating mechanism, a registering mechanism governed by the keys, an operating device for the registering mechanism, a latch for holding said device in operative connection with the operating mechanism, special keys, and means controlled by said keys for operating said latch to disengage the register-operating mechanism from the main operating mechanism.

6. In a cash-register of the class described, the combination with an indicator, of an operating device for the same, a spring for operating said device, a key for putting said spring under tension, and a holding means for said indicator.

7. In a cash-register, the combination with a plurality of keys, of a counter, operating devices for said counter, a counter-actuating pawl, a rock-shaft connected to the movable parts of the machine for actuating said pawl, means for normally holding said pawl out of operative position in relation to the counter, and a special key arranged to cause the depression of said pawl to engage the counter.

8. In a cash-register of the class described, the combination with a plurality of registering-keys, of a series of registering-wheels governed by the same, an independent mechanism adapted to operate the registering mechanism independently of its operation in connection with said keys, a special key for said independent mechanism, and means for adjusting the independent mechanism to render the same inoperative irrespective of the action of its special key.

9. In a cash-register, the combination with a counter, of a series of keys and connections coöperating with said counter, a reciprocating support carrying a counter-operating pawl which is normally out of operative position, and a special independent key arranged when depressed to set the pawl to operate the counter at a time different from its operation in connection with the regular keys.

10. In a cash-register, the combination with a counter, of a series of keys, means controlled by the keys for giving the counter different degrees of movement, a pivoted reciprocating arm, a counter-operating pawl mounted on said arm and normally in inoperative position and a special independent key arranged when depressed to set the pawl to operate the counter.

11. In a cash-register, the combination with an indicator, a pivoted lever carrying a pivoted arm which engages said indicator, a spring connected to said arm and a special key for operating said lever.

12. In a cash-register of the class described the combination with a series of registering-keys, of check-printing devices governed by the same, an independent check-printing device located in proximity to said latter device, an indicator governed by said keys, an independent indicator located in proximity to the first-mentioned indicator, an independent key and connections for controlling the independent printing device and the independent indicator and a registering mechanism governed by the first-mentioned keys and adapted to be independently operated by the independent-key connections during the same operation of the machine with but at a different time from its operation in connection with said series of keys.

13. In a cash-register of the class described, the combination with a plurality of keys, of a registering mechanism governed by the same; a pawl adapted to operate said registering mechanism, a latch for throwing said pawl into or out of operative connection with the operating parts of the machine, special keys, means controlled by said latter keys to operate said latch and an independent key arranged to hold the pawl to engagement with the registering mechanism.

14. In a cash-register of the class described the combination with a plurality of keys, of a registering mechanism, an independent key and connections adapted to operate the registering mechanism independently of its connection with the first-mentioned keys, special keys, a rock-shaft, a lever on said shaft adapted to be operated by said special keys, and devices connected to said shaft for throwing all of the register-operating mechanisms out of operative position.

15. In a cash-register of the class described the combination with a plurality of keys, of an indicator governed by the same, an independent indicator, a locking-pawl for the same, an operating-lever connected to the independent indicator, a spring connected to said lever and a special key adapted to depress said lever and thus put said spring under tension to operate the independent indicator upon the same being released by the operation of its locking-pawl.

16. In a cash-register of the class described the combination with a plurality of keys, of an indicator governed thereby, an independent indicator, a check-printing mechanism also governed by said keys, an independent check-printer, a pivoted lever having two arms connected respectively to the independent indicator and the independent check-printer and an independent key for operating said lever.

17. In a cash-register of the class described the combination with a plurality of keys, of a registering mechanism governed by the same, a pivoted pawl connected to the movable parts of the machine and adapted to operate the registering mechanism independently of its operation through its connection with the keys, a spring-pressed support for normally holding said pawl out of engagement with the registering mechanism and an independent key for holding the pawl down so that it depresses the support and engages the registering mechanism.

18. In a cash-register of the class described the combination with a plurality of keys, of an indicator governed by the same, an independent indicator mounted in proximity to the first-mentioned indicator so as to be read therewith, a pivoted operating-lever, a short indicator-operating lever pivotally mounted on said latter lever, and engaging the independent indicator, a spring connecting said indicator-operating lever to a portion of the frame, and an independent key for depressing the first-mentioned lever.

19. In a cash-register, the combination with an operating mechanism, of an indicator, a key, a spring-actuated member operated by said key and connected to the indicator, and means for preventing said member operating the indicator until after the operating mechanism commences its movement.

20. In a cash-register, the combination with an operating mechanism, of an indicator, a movable member, a pivoted lever mounted on said member and engaging the indicator, a spring connected to said lever, means for operating the movable member to put the spring under tension, and means for locking the indicator.

21. In a cash-register the combination with an indicator, of a pivoted member, a pivoted lever mounted on said member and engaging the indicator, a spring connected to the pivoted lever, and means for operating the pivoted member to put said spring under tension by moving the fulcrum of the lever away from the spring.

22. In a cash-register the combination with an indicator, of a printer, a pivoted member connected to the printer, means for operating said member, an indicator, and a spring connection between the member and indicator whereby the latter may be actuated after the former.

23. In a cash-register, the combination with an operating mechanism, of a counter, counter-controlling keys, a special key, devices controlled by the special key for operating the counter independently of its connection with the first-mentioned keys, a series of special transaction-keys, and means for rendering the special amount-key inoperative in connection with the counter whenever one of the special transaction-keys is operated.

In testimony whereof I affix my signature in presence of two witnesses.

JOSEPH P. CLEAL.

Witnesses:
WM. H. MUZZY,
IRA BERKSTRESSER.

---

It is hereby certified that in Letters Patent No. 724,378, granted March 31, 1903, upon the application of Joseph P. Cleal, of Dayton, Ohio, for an improvement in "Cash-Registers," an error appears in the printed specification requiring correction, as follows: On page 3, after line 60, the following paragraphs should be inserted—

"The special keys 6 which represent respectively Paid Out, Received on Account and Charged are also provided with an indicator wheel 70. This wheel is journaled on a short shaft 71 and is provided upon its periphery with a plurality of spaced indicating words corresponding to the indications of said keys and adapted to be brought into view separately through a suitable sight opening in a guard plate 72 mounted upon the frame in front of said wheel. The said indicator is operated through the following described mechanism: Each of the keys 6, 6, is adapted to contact when depressed with the curved edge of the segmental end 73 of an operating lever 74, which latter is pivoted upon the main frame and is adapted to operate the printing mechanism as fully described in my said patent. The peculiar structure of the curved edge of the end 73, causes the lever 74 to be operated to a greater or less degree according to the key operated. The rack end of said lever 74 is adapted to contact with a pawl carrying lever 75 pivotally mounted upon the shaft 71, to raise said pawl lever and bring the pawl 76 carried thereby into the proper position to engage the desired tooth of a stop rack 77. This rack is formed on the end of a lever 78 which is in turn secured to a sleeve 79 journaled upon the main frame.

"The pawl 76 is limited in its rearward movements by a stop pin 80 mounted upon the lever 75 and is held normally against said pin by a coil spring 81 connected to said pawl and the said lever. The sleeve 79 is provided with a pendent arm 82 and an indicator operating arm 83, the latter having its end formed into a segmental rack 84 which meshes with a gear wheel 85 fast upon the shaft 71. The said pendent arm 82 engages the periphery of a cam 86 mounted upon the auxiliary power shaft 87 of the machine and is thus actuated upon the operation of the machine to rotate the indicator wheel 70 through the above described means.

"The said indicator wheel is held against such rotation by a coil spring 88 secured to its hub portion and also to the frame of the machine. A star wheel 89 is connected to said hub portion and is engaged by a pawl 90 mounted upon the shaft 34, so as to be firmly locked in any of its adjusted positions. It will be observed from the foregoing that when one of the keys 6 is depressed the lever 75 will be operated and thus set the pawl 76 to catch the proper notch of the rack 77. If the machine is now operated the indicator wheel 70 is rotated against the tension of its spring, after first having been released from its pawl 90.

"As the movement continues the arm 82 rides off the greatest diameter of the cam 86 and thus relieves the wheel 70 which then moves backward because of the tension of the spring. This backward movement is checked by the pawl 76 catching in the proper tooth of the rack, which, as before stated, is governed by the position of said pawl. The locking pawl 90 again falls against star wheel 85 after the indicator 70 has been set and thus holds it in position after the pawl 76 has moved from the rack because of the release of the lever 75."

And that the said Letters Patent should be read with this correction therein that the same may conform to the record of the case in the Patent Office.

Signed and sealed this 17th day of January, A. D., 1905.

[SEAL.]

F. I. ALLEN,
*Commissioner of Patents.*